(12) United States Patent
Liu et al.

(10) Patent No.: US 10,914,043 B1
(45) Date of Patent: Feb. 9, 2021

(54) CONSTRUCTION METHOD FOR A CANTILEVER BEAM ON A CENTRAL PIER

(71) Applicants: POLY CHANGDA ENGINEERING CO., LTD., Guangdong (CN); CCCC HIGHWAY CONSULTANTS CO., LTD., Beijing (CN)

(72) Inventors: Gangliang Liu, Guangdong (CN); Chengmin Wang, Guangdong (CN); Zhongwen Wang, Guangdong (CN); Jie Chen, Guangdong (CN); Yiming Xu, Guangdong (CN); Rongfeng Chen, Guangdong (CN); Baihong Deng, Guangdong (CN); Taihao Chen, Guangdong (CN); Yi Zhou, Guangdong (CN); Zungui Lei, Guangdong (CN); Lichuan Cui, Guangdong (CN); Yadang Zhao, Guangdong (CN)

(73) Assignees: POLY CHANGDA ENGINEERING CO., LTD., Guangzhou (CN); CCCC HIGH WAY CONSULTANTS CO., LTD., Beijing (CN)

( * ) Notice: Subject to any disclaimer, the term of this patent is extended or adjusted under 35 U.S.C. 154(b) by 0 days.

(21) Appl. No.: 16/999,143

(22) Filed: Aug. 21, 2020

(30) Foreign Application Priority Data

Aug. 21, 2019 (CN) .......................... 2019 1 0774803

(51) Int. Cl.
*E01D 19/02* (2006.01)
*E01D 21/00* (2006.01)
*E01D 101/24* (2006.01)

(52) U.S. Cl.
CPC ............. *E01D 21/00* (2013.01); *E01D 19/02* (2013.01); *E01D 2101/24* (2013.01)

(58) Field of Classification Search
CPC ...... E01D 19/02; E01D 21/00; E01D 2101/24
(Continued)

(56) References Cited

U.S. PATENT DOCUMENTS

| 3,706,125 A * | 12/1972 | Hopkins | ............... F16L 1/0246 |
| | | | 29/428 |
| 4,977,636 A * | 12/1990 | King | ....................... E01D 19/02 |
| | | | 14/73 |

(Continued)

FOREIGN PATENT DOCUMENTS

| CN | 206512588 U | 9/2017 |
| CN | 107974921 A | 5/2018 |

(Continued)

*Primary Examiner* — Raymond W Addie
(74) *Attorney, Agent, or Firm* — Wayne & Ken, LLC; Tony Hom

(57) ABSTRACT

A construction method for a cantilever beam on a central pier. A scaled model of the cantilever beam on the central pier is established and tested to obtain the stress distribution regularities of the cantilever beam according to test data and analysis results of the scaled model, so as to find out week parts of the cantilever beam, and thus the optimization design can be performed to make the cantilever beam reasonably carry the load and improve the materials with a higher utilization ratio. The wheeled stand support used in the present application has a high turnover rate and it is easy and convenient to dismantle and assemble the wheeled stand support. A height of the cantilever beam mold can be adjusted by a hydraulic cylinder.

1 Claim, 6 Drawing Sheets

(58) Field of Classification Search
USPC .................................................. 14/75, 77.3
See application file for complete search history.

(56) References Cited

U.S. PATENT DOCUMENTS

| | | | | |
|---|---|---|---|---|
| 5,655,243 | A * | 8/1997 | Kim | E01D 21/00 14/74.5 |
| 5,940,917 | A * | 8/1999 | Wilson | E04G 13/02 14/77.1 |
| 7,469,439 | B2 * | 12/2008 | Tokuno | E01D 2/00 14/73 |
| 7,546,656 | B2 * | 6/2009 | Kim | E01D 2/00 14/75 |
| 8,341,788 | B2 * | 1/2013 | Kim | E01D 19/00 14/77.3 |
| 8,910,336 | B2 * | 12/2014 | Han | E01D 19/02 14/75 |
| 2011/0016645 | A1 * | 1/2011 | Porter | E01D 22/00 14/77.1 |
| 2015/0286751 | A1 * | 10/2015 | Sayed | G01N 3/00 703/1 |
| 2019/0169846 | A1 * | 6/2019 | Azizinamini | E04B 5/19 |

FOREIGN PATENT DOCUMENTS

| | | |
|---|---|---|
| CN | 108086130 A | 5/2018 |
| CN | 108316152 A | 7/2018 |
| JP | H07224409 A | 8/1995 |
| JP | 2002146720 A | 5/2002 |

* cited by examiner

CONSTRUCTION METHOD FOR A CANTILEVER BEAM ON A CENTRAL PIER

CROSS-REFERENCE TO RELATED APPLICATIONS

This application claims the benefit of priority from Chinese Patent Application No. 201910774803.5, filed on Aug. 21, 2019. The content of the aforementioned application, including any intervening amendments thereto, is incorporated herein by reference in its entirety.

TECHNICAL FIELD

The present application relates to bridge beam construction, and more particularly to a construction method for a cantilever beam on a central pier.

BACKGROUND

There are two methods for constructing a capping beam in the prior art. One is to support the capping beam by building full space supports via steel pipes, and the other is to reserve holes in a pier to pass through steel rods, so as to support the capping beam. The former method requires a lot of manpower to build steel pipe scaffolds, which consumes time and a large number of steel pipes, greatly increasing the construction cost. The latter method reserves the holes in the pier to pass through the steel rods, and these holes are required to be repaired after the construction of the capping beam is completed, which not only affects the appearance of the pier, but also increases the construction processes. These existing construction methods no longer meet the appearance and quality requirements of the newly designed bridges.

Chinese Patent Application Publication No. 102261042 A discloses an inclined cantilever support for pouring a pier capping beam, where the full space supports built by the steel pipes are not involved, which can reduce the manpower and steel pipe support materials consumption. However, it is not convenient to move the inclined cantilever support during the use, reducing the turnover rate of the inclined cantilever support.

SUMMARY

The present application aims to provide a construction method for a cantilever beam on a central pier, where a scaled model of the cantilever beam on the central pier is established and tested. According to test data and analysis results of the scaled model, the stress distribution regularities of the cantilever beam are obtained, so as to find out week parts of the cantilever beam, and thus the optimization design can be performed to make the cantilever beam reasonably carry the load and improve the materials with a higher utilization ratio. A wheeled stand support used in the present application has a high turnover rate and it is easy and convenient to dismantle and assemble the wheeled stand support, so as to ensure the construction period requirement and the construction safety and improve the utilization ratio of the materials, being time-consuming and labor-saving. A height of the cantilever beam mold can be adjusted by the hydraulic cylinder, benefiting the construction of the cantilever beam.

The present application aims to solve the following technical problems.

1) How to establish the scaled model of the cantilever beam on the central pier and test the scaled model to identify the performance of the cantilever beam; by determining the stress distribution regularities of the cantilever beam, week parts of the cantilever beam can be found out, so as to perform the optimization design to make the cantilever beam reasonably carry the load.

2) How to construct a wheeled stand support for the construction of the cantilever beam on the central pier to improve the turnover rate of a capping beam support.

A construction method for a cantilever beam on a central pier, comprising:

1) establishing a scaled model of the cantilever beam on the central pier; and testing the scaled model and constructing the cantilever beam when a test result of the scaled model reaches a given threshold;

2) supporting a bottom of the cantilever beam with a wheeled stand support;

3) installing a cantilever beam mold;

4) securing cantilever beam rebar by tying wire; and 5) hoisting the cantilever beam rebar into the cantilever beam mold by a crane followed by concrete pouring;

in step (1), testing the scaled model comprising:

1) determining control sections of the scaled model; applying on-site loading at the control sections of the scaled model under normal conditions and overload conditions; and setting the control sections of the scaled model as $A_i$, $i=1, 2 \ldots n$;

2) recording bending moments at $A_i$ of the scaled model by a motion detector; setting a bending moment at $A_i$ of the scaled model before applying the on-site loading as $M_0$; setting a bending moment at $A_i$ of the scaled model when the scaled model breaks as $M_p$; setting a bending moment at $A_i$ of the scaled model under maximum normal conditions as $M_1$; and setting a bending moment at $A_i$ of the scaled model under maximum overload conditions as $M_2$;

3) calculating a first safety factor $K_1$ at $A_i$ of the scaled model under the maximum normal conditions according to $$K_1 = \frac{M_P}{M_1};$$

4) calculating a first overload factor $P_1$ at $A_i$ of the scaled model under the maximum normal conditions according to $$P_1 = \frac{M_P - M_0}{M_1 - M_0};$$

5) calculating a second safety factor $K_2$ at $A_i$ of the scaled model under the maximum overload conditions according to $$K_2 = \frac{M_P}{M_2};$$

6) calculating a second overload factor $P_2$ at $A_i$ of the scaled model under the maximum overload conditions according to $$P_2 = \frac{M_P - M_0}{M_2 - M_0};$$

and 7) acquiring pictures of the scaled model at Ai of the scaled model by an acquisition device and identifying the number of cracks in the pictures; and constructing the cantilever beam when all of the first safety factor, the second safety factor, the first overload factor and the second overload factor are within a preset threshold range and there are no cracks;

wherein the wheeled stand support comprises a first frame and a second frame; the first frame and the second frame each comprise two bases; two ends of each base are respectively provided with a road wheel; and two guides are symmetrically provided on an upper end surface of the base;

a hydraulic cylinder is provided inside each guide; an oil pump is provided at a side of the guide via bolts and is configured to supply power to the hydraulic cylinder; a top end of a piston rod of the hydraulic cylinder is connected to a bottom of a support beam provided inside the guide; a top end of the support beam is fixedly connected to an end of an H-shaped beam; a cross beam is provided at a middle of the H-shaped beam; a triangular bracket is provided on a top of the cross beam; and a support base is welded onto a top of the triangular bracket to support the cantilever beam;

a groove is provided on a bottom of the support base; a plurality of threaded holes are symmetrically provided on both side walls of the groove of the support base; a threaded rod is in threaded connection with each threaded hole; a stopper is welded at an end of the threaded rod; and a rotating handle is welded at the other end of the threaded rod;

first bracing frames are symmetrically welded on both sides of the triangular bracket; second bracing frames are symmetrically welded on both sides of the triangular bracket; each first bracing frame and each second bracing frame are respectively provided with a first installation groove; a first rotating shaft provided on the first installation groove is rotatably connected to an end of a first connecting rod; a second installation groove is provided in a middle of a side of the first bracing frame and the second bracing frame, respectively; a second rotating shaft is provided at the second installation groove; an end of a first Y-shaped connecting rod is connected to a middle of the second rotating shaft; and a U-shaped end of a second Y-shaped connecting rod is connected to two ends of the second rotating shaft;

the cantilever beam mold comprises two opposite side plates installed in parallel and two opposite end plates installed in parallel; and each end plate is perpendicular to each side plate;

each side plate comprises a middle side plate, two first side plates and two second side plates; the two second side plates are respectively provided on two sides of the middle side plate; and the two first side plates are respectively provided on sides of the two second side plates away from the middle side plate;

a rectangular baffle plate is welded on the middle side plate; and two ends of the rectangular baffle plate are respectively fixed to the two second side plates via bolts;

a third installation groove is provided on each first side plate and each second side plate, respectively; a third rotating shaft is provided at the third installation groove; the other end of the first connecting rod is connected to a middle of the third rotating shaft; and a U-shaped end of the first Y-shaped connecting rod is connected to two ends of the third rotating shaft;

a fourth installation groove is provided under the third installation groove; a fourth rotating shaft is provided at the fourth installation groove; and an end of the second Y-shaped connecting rod is connected to a middle of the fourth rotating shaft; and a rectangular slot is provided on the middle side plate to clamp a pier-top.

The present application has the following beneficial effects.

1) A scaled model of the cantilever beam on the central pier is established and tested. According to test data and analysis results of the scaled model, the stress distribution regularities of the cantilever beam are obtained, so as to find out week parts of the cantilever beam, and thus the optimization design can be performed to make the cantilever beam reasonably carry the load and improve the materials with a higher utilization ratio.

2) A wheeled stand support used in the present application has a high turnover rate and it is easy and convenient to dismantle and assemble the wheeled stand support, so as to ensure the construction period requirement and the construction safety and improve the utilization ratio of the materials, being time-consuming and labor-saving. A height of the cantilever beam mold can be adjusted by the hydraulic cylinder, benefiting the construction of the cantilever beam.

BRIEF DESCRIPTION OF THE DRAWINGS

The present application will be further described below with reference to the accompanying drawings.

DETAILED DESCRIPTION OF EMBODIMENTS

Figure 1:
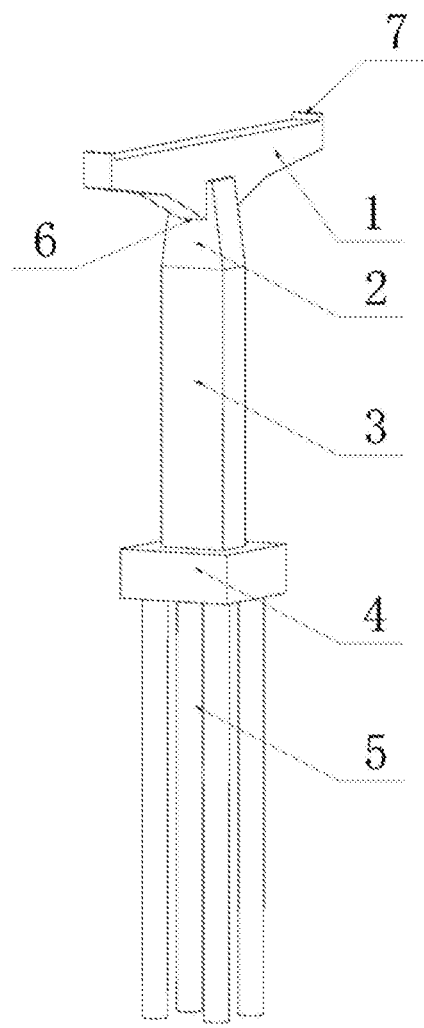
FIG. 1 is a schematic diagram of a cantilever beam on a central pier according to the present application.
Figure 2:
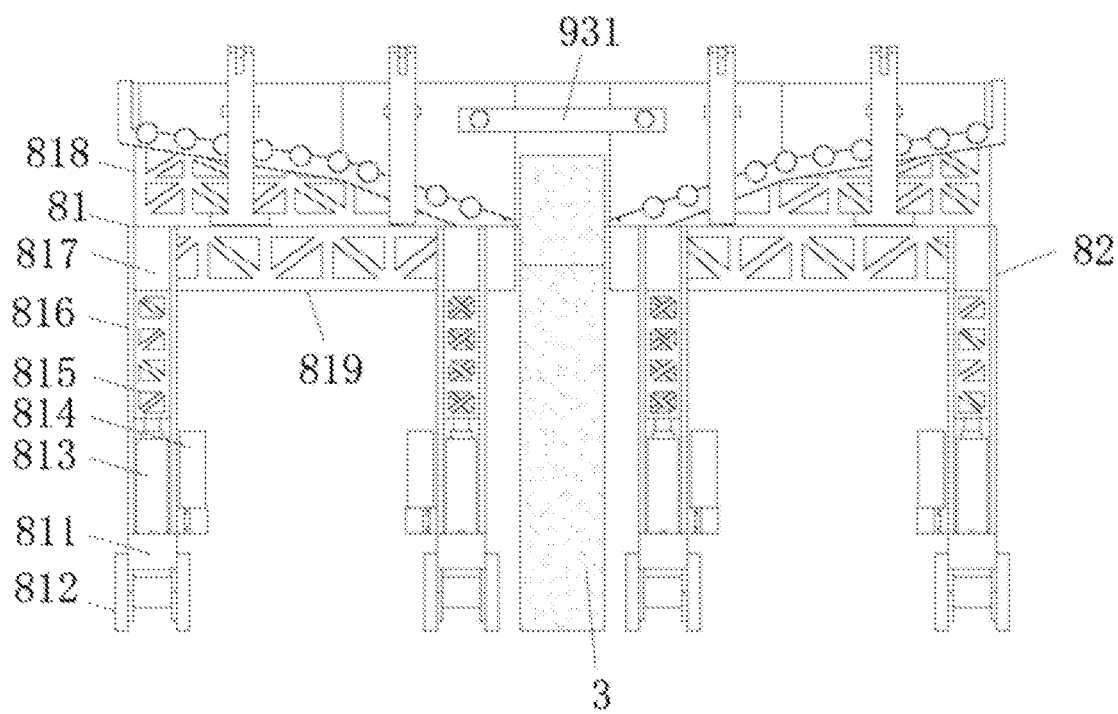
FIG. 2 is a front view of a wheeled stand support according to the present application.
Figure 3:
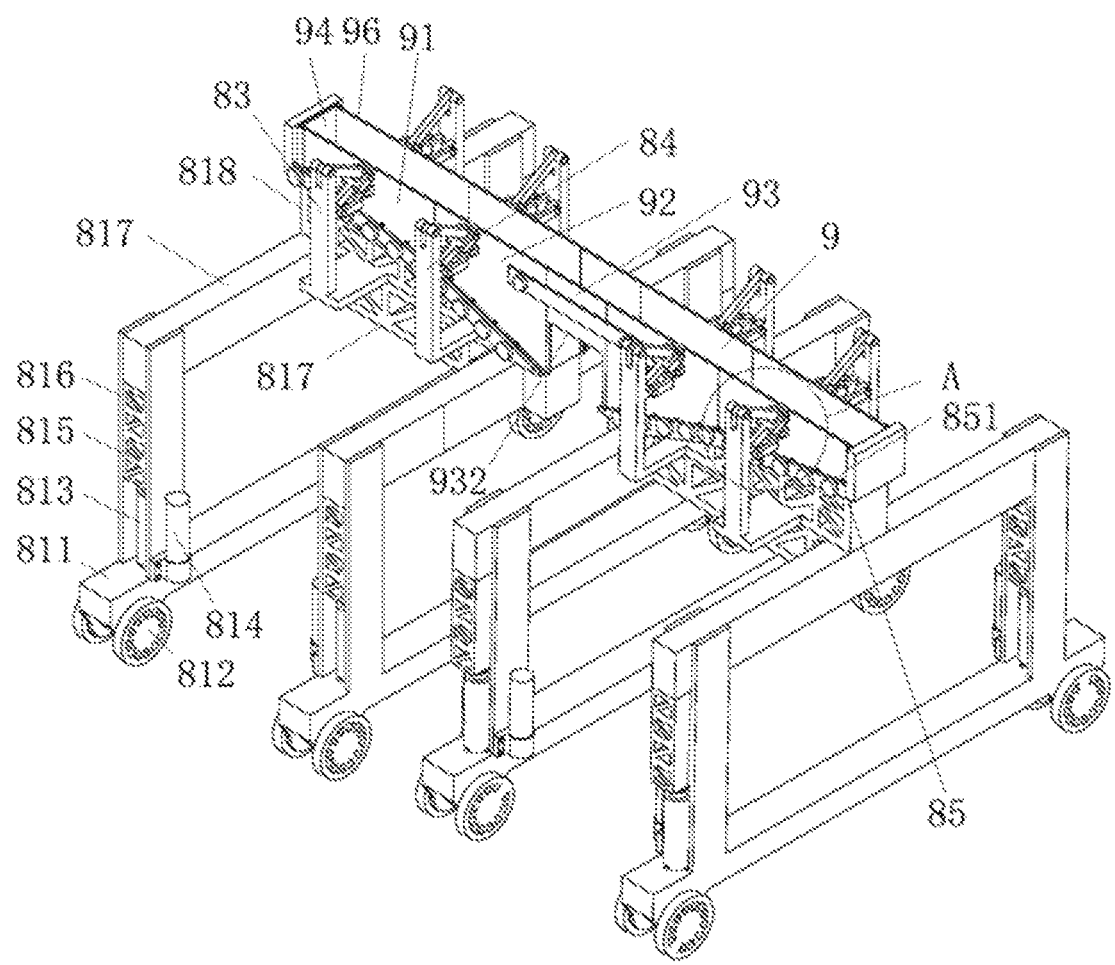
FIG. 3 is a schematic diagram of the wheeled stand support according to the present application.
Figure 4:
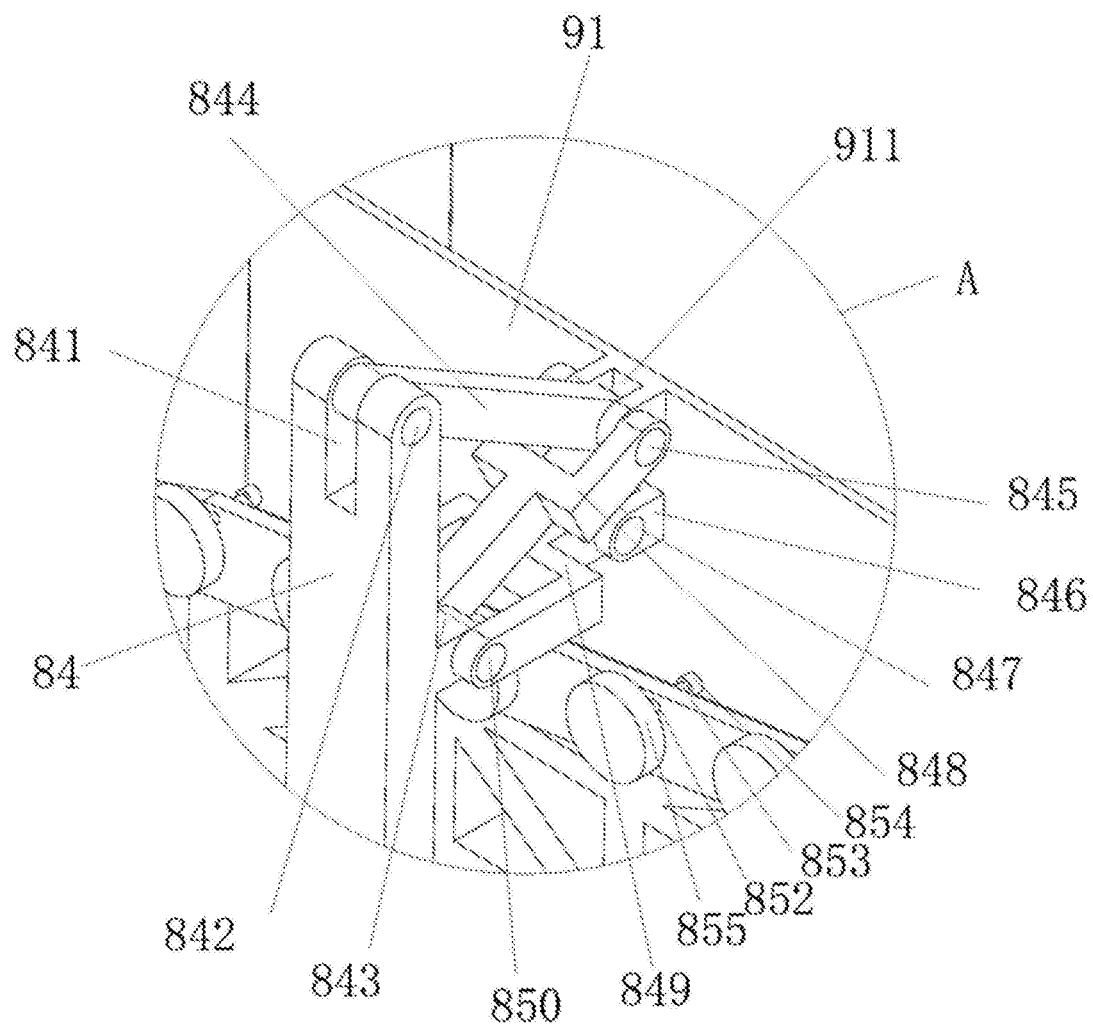
FIG. 4 is an enlarged view of Detail A in FIG. 3.

The technical solutions of the embodiments will be clearly and completely described below with reference to the accompanying drawings in the embodiments of the present application. Obviously, the embodiments disclosed herein are merely illustrative, and are not intended to limit the present application. Any other embodiments made by those skilled in the art based on the embodiments of the present application without sparing any creative efforts shall fall within the scope of the present application.

The present application provides a construction method for a cantilever beam on a central pier. As shown in FIGS. 1-8, there is shown a cantilever beam 1. A bottom end of the cantilever beam 1 is installed in a pier groove 6 which is provided on a pier-top 2. A bottom of the pier-top 2 is installed on a top of a bridge pier 3. A bottom of the bridge pier 3 is installed on an upper end surface of a rectangular bearing platform 4. Four cast-in-place bored piles 5 are provided on a lower end surface of the rectangular bearing platform 4. Two blocks 7 are symmetrically provided on both sides of an upper end surface of the cantilever beam 1.

The pier-top 2 and the bridge pier 3 are integrally poured and formed using C50 concrete. The rectangular bearing platform 4 is poured and formed using C35 concrete. The four cast-in-place bored piles 5 are poured and formed using C30 underwater concrete.

The construction method for the cantilever beam on the central pier includes the following steps.

1) Scaled models of the cantilever beam on the central pier are established. The scaled models are tested. The cantilever beam 1 can be constructed when a test result of the scaled model reaches a given threshold. A 1:4 scaled model having an upper structure with a span length of 30 m is tested in the first test, and a 1:4 scaled model having an upper structure with a span length of 35 m is tested in the second test.

S1) Control sections of the scaled model are selected. On-site loading is applied at the control sections of the scaled model under normal conditions and overload conditions. The control sections of the scaled model are set as Ai, i=1, 2 . . . n. The scaled model is tested for the first time.

Figure 7:
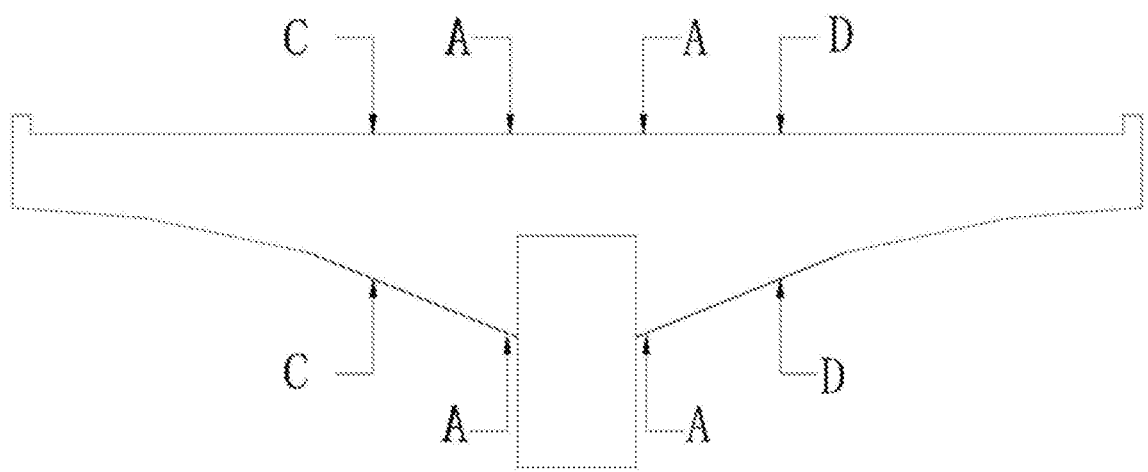
FIG. 7 shows control sections of the scaled model of the cantilever beam in a first test according to the present application.
Figure 8:
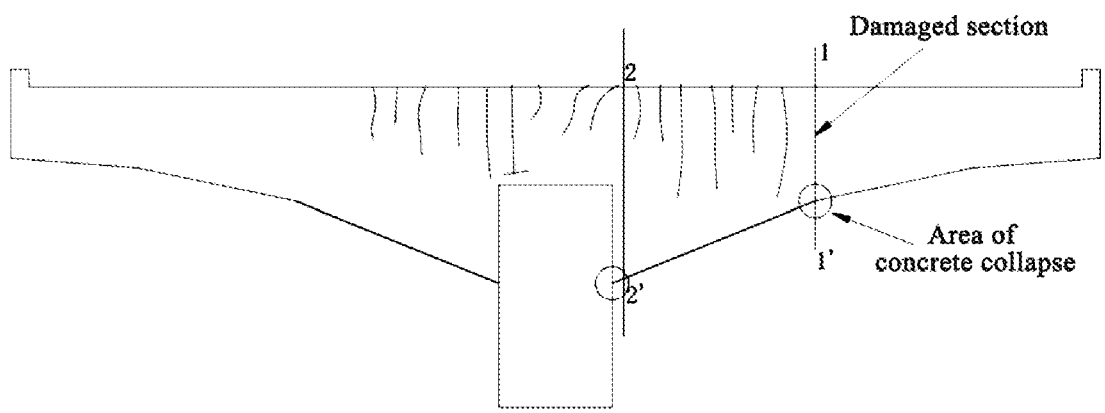
FIG. 8 shows a damaged section of the cantilever beam in the first test according to the present application.

FIGS. 7-8 show the on-site loading applied at the control sections of the scaled model under normal conditions and overload conditions. It can be seen that there is no crack at A-A and C-C of the control sections of the scaled model. After the on-site loading continues to be applied, the cantilever beam breaks prior to the bridge pier. The fissure of the damaged section is close to a root of the cantilever beam. Load combinations on the scaled model under various use conditions in the first test are shown in Table 1. Safety factors and overload factors of the cantilever beam and the bridge pier are shown in Table 2.

TABLE 1

Load combinations on the scaled
model under various use conditions in the first test

| Use Condition Type | Load combinations |
| --- | --- |
| Normal conditions | Case 1: constant load + first-classed road (No. 4 lane) |
| | Case 2: constant load + first-classed road (No. 3 lane) + two heavy vehicles with 120 t (No. 1 lane on the outermost side) + wind-induced load |
| | Case 3: constant load + first-classed road (No. 2 lane next to the outermost side) + two heavy vehicles with 120 t (No. 1 lane on the outermost side) + wind-induced load |
| | Case 4: constant load + first-classed road (No. 1 lane next to the outermost side) + two heavy vehicles with 120 t (No. 1 lane on the outermost side) + wind-induced load |
| | Case 5: constant load + first-classed road (No. 3 lane) + 3.4 times first-classed road (No. 1 lane next to the outermost side) + wind-induced load |
| Overload conditions | Case 1: constant load + first-classed road (No. 2 lane next to the outermost side) + two heavy vehicles with 120 t (No. 1 lane on the outermost side) + wind-induced load |
| | Case 2: constant load + first-classed road (No. 2 lane next to the outermost side) + two heavy vehicles with 120 t (No. 2 lane on the outermost side) + wind-induced load |
| | Case 3: constant load + first-classed road (No. 2 lane next to the outermost side) + two heavy vehicles with 120 t (No. 2 lane on the outermost side) + wind-induced load |

TABLE 2

Safety factors and overload factors
of the cantilever beam and the bridge pier

| Cross sections | Maximum normal conditions | | Maximum overload conditions | |
| --- | --- | --- | --- | --- |
| | First safety factor | First overload factor | Second safety factor | Second overload factor |
| A | 2.42 | 7.21 | 1.89 | 4.09 |
| C | 2.58 | 7.42 | 2.02 | 4.29 |
| Pier top | 1.81 | 6.45 | 1.47 | 3.4 |
| Pier bottom | 1.77 | 6.45 | 1.45 | 3.4 |
| Damaged section | 2.82 | 7.8 | 2.2 | 4.65 |

S2) Bending moments at Ai of the scaled model are acquired by a motion detector. A bending moment at Ai of the scaled model before applying the on-site loading is set as $M_0$. A bending moment at Ai of the scaled model when the scaled model breaks is set as $M_p$. A bending moment at Ai of the scaled model under maximum normal conditions is set as $M_1$. A bending moment at Ai under maximum overload conditions is set as $M_2$.

S3) A first safety factor $K_1$ at Ai of the scaled model under the maximum normal conditions is calculated according to $$K_1 = \frac{M_P}{M_1}.$$

S4) A first overload factor $P_1$ at Ai of the scaled model under the maximum normal conditions is calculated according to $$P_1 = \frac{M_P - M_0}{M_1 - M_0};$$

S5) A second safety factor $K_2$ at Ai of the scaled model under the maximum overload conditions is calculated according to $$K_2 = \frac{M_P}{M_2};$$

S6) A second overload factor $P_2$ at Ai of the scaled model under the maximum overload conditions is calculated according to $$P_2 = \frac{M_P - M_0}{M_2 - M_0};$$

S7) Pictures of the scaled model at Ai of the scaled model are acquired by an acquisition device and the number of cracks in the pictures is identified. When all of the first safety factor, the second safety factor, the first overload factor and the second overload factor are within a preset threshold range and there are no cracks, the cantilever beam can be constructed.

The cantilever beam and the bridge pier are in an elastic state in the processes of prestress tension and applying the weight, i.e., in the construction process. The cantilever beam and the bridge pier under predetermined overload conditions are basically in an elastic state and no cracks are found, indicating the structure of the cantilever beam and the bridge pier has the good mechanical performance.

Operating conditions that can cause damage reach when load is gradually enlarged based on maximum axial force conditions of the bridge pier. Load is gradually applied at loading points marked as 2, 2', 1 and 1'. Finally, when load reaches 1200 kN at the loading points marked as 2 and 2' and load reaches 700 kN at the loading points marked as 1 and 1', the concrete collapses at the junction of a lower edge of the cantilever beam and a top of the pier-top, indicating the structure is damaged. Through the tests, the normal conditions and the carrying capacity of the cantilever beam are designed and verified.

A second test is performed on the scaled model.

Figure 5:
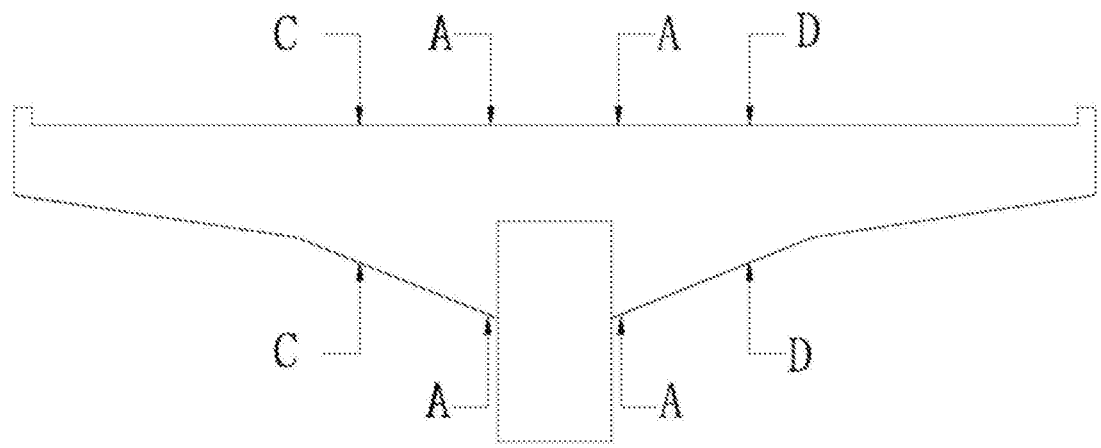
FIG. 5 shows control sections of a scaled model of the cantilever beam in a second test according to the present application.
Figure 6:
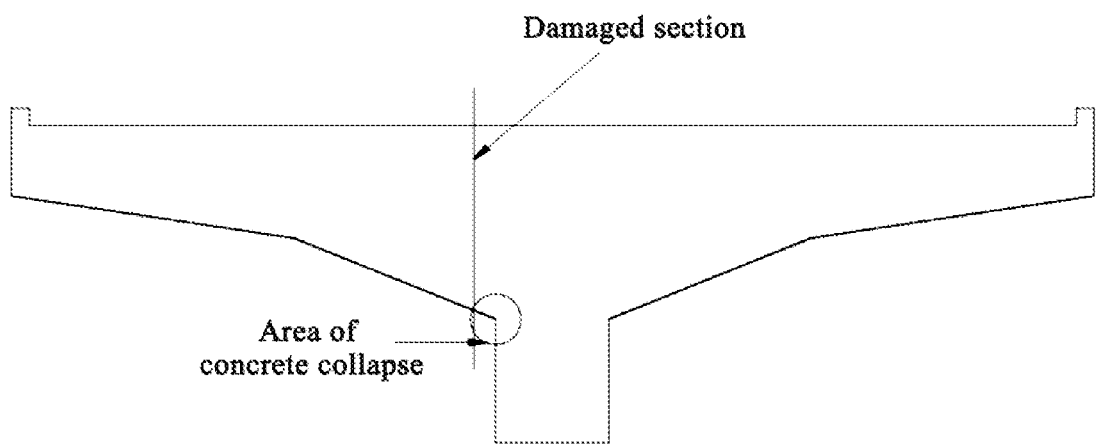
FIG. 6 shows a damaged section of the cantilever beam in the second test according to the present application.

Compared to the first test, the second test only adjusts the size of the cantilever beam and changes a three-fold line at a bottom of the cantilever beam into a double-fold line. As shown in FIGS. 5-6, the cantilever beam breaks prior to the bridge pier, and the damaged section is located at the lower edge of the cantilever beam.

TABLE 3

Load combinations on the scaled model under various use conditions in the second test

| Use Condition Type | Load combinations |
| --- | --- |
| Normal conditions | Case 1: constant load + first-classed road (No. 4 lane) |
| Overload conditions | Case 1: constant load + first-classed road (No. 3 lane) + two heavy vehicles with 120 t (No. 1 lane on the outermost side) + wind-induced load |
| | Case 2: constant load + first-classed road (No. 2 lane next to the outermost side) + two heavy vehicles with 120 t (No. 1 lane on the outermost side) + wind-induced load |
| | Case 3: constant load + first-classed road (No. 1 lane next to the outermost side) + two heavy vehicles with 120 t (No. 1 lane on the outermost side) + wind-induced load |
| | Case 4: constant load + first-classed road (No. 3 lane) + 3.4 times first-classed road (No. 1 lane next to the outermost side) + wind-induced load |
| | Case 5: constant load + first-classed road (No. 2 lane next to the outermost side) + two heavy vehicles with 120 t (No. 1 lane on the outermost side) + wind-induced load |
| | Case 6: constant load +f irst-classed road (No. 2 lane next to the outermost side) + two heavy vehicles with 120 t (No. 2 lane on the outermost side) + wind-induced load |
| | Case 7: constant load + first-classed road (No. 2 lane next to the outermost side) + two heavy vehicles with 120 t (No. 2 lane on the outermost side) + wind-induced load |

Safety factors of control sections of the cantilever beam are shown in Table 4.

TABLE 4

Safety factors of the control sections of the cantilever beam

| Factors | Case 1 of normal conditions | Case 1 of overload conditions | Case 3 of overload conditions | Case 4 of overload conditions | Case 7 of overload conditions |
| --- | --- | --- | --- | --- | --- |
| Safety factors | 6.91 | 2.6 | 2.84 | 2.54 | 1.45 |

The cantilever beam and the bridge pier are in an elastic state in the processes of prestress tension and applying weight, i.e., in the construction process.

When the load is gradually applied until the case 5 of the overload conditions reaches, there are cracks appeared in the bridge pier. When the load increases until the cases 6 and 7 of the overload conditions reach, the cracks merge in the horizontal direction. The merged crack is enlarged in length and width, for example, a maximum width of the merged crack is 0.14 mm, at this time, the structure is not damaged.

Under the operating conditions that cause damage, load reaches 240 kN at the loading point marked as 1, and load reaches 660 kN at the loading point marked as 2. The concrete at the pier groove of the pier-top collapses, indicating the structure is damaged. A maximum vertical displacement of the cantilever beam is 31 cm, and a maximum horizontal displacement of the pier-top is 5.91 mm. After being disassembled, cantilever beam has a maximum vertical residual deformation of 24 cm.

Through these tests, it is concluded that the structure meets the design requirements.

2) A wheeled stand support 8 is used to support a bottom of the cantilever beam. The wheeled stand support 8 includes a first frame 81 and a second frame 82. The first frame 81 and the second frame 82 each comprise two bases 811. Two ends of each base 811 are respectively provided with a road wheel 812. Two guides 816 are symmetrically provided on an upper end surface of the base 811.

A hydraulic cylinder 813 is provided inside each guide 816. An oil pump 814 is provided at a side of the guide 816 via bolts and is configured to supply power to the hydraulic cylinder 813. A top end of a piston rod of the hydraulic cylinder 813 is connected to a bottom of a support beam 815 provided inside the guide 816. A top end of the support beam 815 is fixedly connected to an end of an H-shaped beam 817. A cross beam 819 is provided at a middle of the H-shaped beam 817. A triangular bracket 818 is provided on a top of the cross beam 819. A support base 85 is welded onto a top of the triangular bracket 818 to support the cantilever beam.

A groove 851 is provided on a bottom of the support base 85. A plurality of threaded holes 852 are symmetrically provided on both side walls of the groove 851 of the support base. A threaded rod 853 is in threaded connection with each threaded hole 852. A stopper 854 is welded at an end of the threaded rod 853. A rotating handle 855 is welded at the other end of the threaded rod 853.

First bracing frames 83 are symmetrically welded on both sides of the triangular bracket 818. Second bracing frames 84 are symmetrically welded on both sides of the triangular bracket 818. Each first bracing frame 83 and each second bracing frame 84 are respectively provided with a first installation groove 841. A first rotating shaft 842 provided on the first installation groove 841 is rotatably connected to an end of a first connecting rod 844. A second installation groove 843 is provided in a middle of a side of the first bracing frame 83 and the second bracing frame 84, respectively. A second rotating shaft 850 is provided at the second installation groove 843. An end of a first Y-shaped connecting rod 848 is connected to a middle of the second rotating shaft 850. A U-shaped end of a second Y-shaped connecting rod 849 is connected to two ends of the second rotating shaft 850.

3) A cantilever beam mold 9 is installed. The cantilever beam mold 9 includes two opposite side plates 96 installed in parallel and two opposite end plates 94 installed in parallel. Each end plate 94 is perpendicular to each side plate 96.

Each side plate 96 includes a middle side plate 93, two first side plates 92 and two second side plates 91. The two second side plates 91 are respectively provided on two sides of the middle side plate 93. The two first side plates 92 are respectively provided on sides of the two second side plates 91 away from the middle side plate 93.

A rectangular baffle plate 931 is welded on the middle side plate 93. Two ends of the rectangular baffle plate 931 are respectively fixed to the two second side plates 92 via bolts.

A third installation groove 911 is provided on each first side plate 91 and each second side plate 92, respectively. A third rotating shaft 845 is provided at the third installation groove 911. The other end of the first connecting rod 844 is connected to a middle of the third rotating shaft 845. A U-shaped end of the first Y-shaped connecting rod 848 is connected to two ends of the third rotating shaft 845.

A fourth installation groove 846 is provided under the third installation groove 911. A fourth rotating shaft 847 is provided at the fourth installation groove 846. An end of the second Y-shaped connecting rod 849 is connected to a middle of the fourth rotating shaft 847.

A rectangular slot 932 is provided on the middle side plate 93 to clamp a pier-top 2.

The wheeled stand support 8 and the middle side plate 93 are installed through the following steps.

SS1) The first frame 81 and the second frame 82 are respectively installed on both sides of the bridge pier 3, simultaneously. A bottom of the hydraulic cylinder 813 is provided on the base 811. The bottom of the support beam 815 is connected to the piston rod of the hydraulic cylinder 813 via flanges and bolts. The oil pump 814 is provided on the guide 816 via screws and connected to the hydraulic cylinder 813 by an oil pipe.

SS2) The two bases 811 are placed in parallel. The H-shaped beam 817 is placed above the support beam 815 by a crane and fixedly connected to the support beam 815 via bolts.

SS3) The threaded rod 853 is in threaded connection with each threaded hole 852 and passes through the threaded hole 852. The stopper 854 is welded to an end of the threaded rod 853 that passes through the threaded hole 852. The rotating handle 855 is welded at the other end of the threaded rod 853.

SS4) Bottoms of the first side plate 91 and the second side plate 92 are placed in the groove 851. The end of the first connecting rod 844 is installed in the first installation groove 841 through the first rotating shaft 842. The other end of the first connecting rod 844 is located inside the third installation groove 911. The U-shaped end of the first Y-shaped connecting rod 848 is located at two sides of the third installation groove 911. The first connecting rod 844 and the first Y-shaped connecting rod 848 are fixed on the third installation groove 911 through the third rotating shaft 845. The other end of the first Y-shaped connecting rod 848 is located inside the second installation groove 843, and the U-shaped end of the second Y-shaped connecting rod 849 is located on both sides of the second installation groove 843. The first Y-shaped connecting rod 848 and the second Y-shaped connecting rod 849 are fixed in the second installation groove 843 through the second rotating shaft 850. The other end of the second Y-shaped connecting rod 849 is installed in the fourth installation groove 846 through the fourth rotating shaft 847.

SS5) The triangular bracket 818 is hoisted on the cross beam 819 by a crane and fixed to the cross beam 819 via bolts. The locations of the first frame 81 and the second frame 82 are adjusted to make two cross beams 819 symmetrical to the bridge pier 3. At the same time, the oil pump 814 is controlled to provide power to the hydraulic cylinder 813 to allow the hydraulic cylinder 813 to move the support beam 815, the H-shaped beam 817 and the triangular bracket 818 upward. The rectangular baffle plate 931 is welded on the middle side plate 93. Two ends of the rectangular baffle plate 931 are respectively fixed to the two second side plates 92 via bolts.

The rectangular slot 932 is provided on the middle side plate 93 to clamp the pier-top 2. The two end plates 94 are inserted at two ends of the side plates 96 to realize the installation of the wheeled stand support 8 and the cantilever beam mold. The wheeled stand support used in the present application has a high turnover rate and it is easy and convenient to dismantle and assemble the wheeled stand support, so as to ensure the construction period requirement and the construction safety and improve the utilization ratio of the materials, being time-consuming and labor-saving. A height of the cantilever beam mold can be adjusted by the hydraulic cylinder, benefiting the construction of the cantilever beam.

4) Cantilever beam rebar is secured by tying wire.

5) The cantilever beam rebar is hoisted into the cantilever beam mold 9 by a crane followed by concrete pouring. The concrete pouring is implemented as follows.

The concrete is mixed in a centralized batch plant and then is transported to the pouring site by a concrete transport truck and sent to a pouring surface of the cantilever beam mold 9 by a concrete pump. If the concrete pouring height exceeds or equals to 2 m, a connecting tube can be used to transport the concrete to the working surface. After the concrete pouring is completed, an immersion vibrator is inserted to vibrate the concrete at a depth of 50-100 mm of a lower concrete layer, so that the concrete at the joint of the two layers is evenly integrated. The distance between the immersion vibrator and the cantilever beam mold 9 ranges from 50 to 100 mm.

The working principle of the present application is described as follows.

The scaled model of the cantilever beam on the central pier is established and tested. According to test data and analysis results of the scaled model, the stress distribution regularities of the cantilever beam are obtained, so as to find out week parts of the cantilever beam, and thus the optimization design can be performed to make the cantilever beam reasonably carry the load and improve the materials with a higher utilization ratio.

The first frame 81 and the second frame 82 are respectively installed on both sides of the bridge pier 3, simultaneously. A bottom of the hydraulic cylinder 813 is provided on the base 811. The bottom of the support beam 815 is connected to the piston rod of the hydraulic cylinder 813 via flanges and bolts. The oil pump 814 is provided on the guide 816 via screws and connected to the hydraulic cylinder 813 by an oil pipe.

The two bases 811 are placed in parallel. The H-shaped beam 817 is placed above the support beam 815 by a crane and fixedly connected to the support beam 815 via bolts.

The threaded rod 853 is in threaded connection with each threaded hole 852 and passes through the threaded hole 852. The stopper 854 is welded to an end of the threaded rod 853 that passes through the threaded hole 852. The rotating handle 855 is welded at the other end of the threaded rod 853.

Bottoms of the first side plate 91 and the second side plate 92 are placed in the groove 851. The end of the first connecting rod 844 is installed in the first installation groove 841 through the first rotating shaft 842. The other end of the first connecting rod 844 is located inside the third installation groove 911. The U-shaped end of the first Y-shaped connecting rod 848 is located at two sides of the third installation groove 911. The first connecting rod 844 and the first Y-shaped connecting rod 848 are fixed on the third installation groove 911 through the third rotating shaft 845. The other end of the first Y-shaped connecting rod 848 is located inside the second installation groove 843, and the U-shaped end of the second Y-shaped connecting rod 849 is located on both sides of the second installation groove 843. The first Y-shaped connecting rod 848 and the second Y-shaped connecting rod 849 are fixed in the second installation groove 843 through the second rotating shaft 850. The other end of the second Y-shaped connecting rod 849 is installed in the fourth installation groove 846 through the fourth rotating shaft 847.

The triangular bracket 818 is hoisted on the cross beam 819 by a crane and fixed to the cross beam 819 via bolts. The locations of the first frame 81 and the second frame 82 are adjusted to make two cross beams 819 symmetrical to the bridge pier 3. At the same time, the oil pump 814 is controlled to provide power to the hydraulic cylinder 813 to allow the hydraulic cylinder 813 to move the support beam 815, the H-shaped beam 817 and the triangular bracket 818 upward. The rectangular baffle plate 931 is welded on the middle side plate 93. Two ends of the rectangular baffle plate 931 are respectively fixed to the two second side plates 92 via bolts.

The rectangular slot 932 is provided on the middle side plate 93 to clamp the pier-top 2. The two end plates 94 are inserted at two ends of the side plates 96 to realize the installation of the wheeled stand support 8 and the cantilever beam mold. The wheeled stand support used in the present application has a high turnover rate and it is easy and convenient to dismantle and assemble the wheeled stand support, so as to ensure the construction period requirement and the construction safety and improve the utilization ratio of the materials, being time-consuming and labor-saving. A height of the cantilever beam mold 9 can be adjusted by the hydraulic cylinder 813, benefiting the construction of the cantilever beam.

The descriptions herein are intended to illustrate the present invention. Any modifications, additions and replacements made by those skilled in the art based on the embodiments disclosed herein and without departing from the spirit of the present application shall fall within the scope as defined by the appended claims.

What is claimed is:

1. A construction method for a cantilever beam on a central pier, comprising:
   1) establishing a scaled model of the cantilever beam on the central pier; and testing the scaled model and constructing the cantilever beam when a test result of the scaled model reach a given threshold;
   2) supporting a bottom of the cantilever beam with a wheeled stand support;
   3) installing a cantilever beam mold;
   4) securing cantilever beam rebar by tying wire; and
   5) hoisting the cantilever beam rebar into the cantilever beam mold by a crane followed by concrete pouring;
   wherein in step (1), testing the scaled model comprising:
   1) determining control sections of the scaled model; applying on-site loading at the control sections of the scaled model under normal conditions and overload conditions; setting the control sections of the scaled model as Ai, and i is an integer greater than or equal to 1;
   2) recording bending moments at Ai of the scaled model by a motion detector; setting a bending moment at Ai of the scaled model before applying the on-site loading as $M_0$; setting a bending moment at Ai of the scaled model when the scaled model breaks as $M_p$; setting a bending moment at Ai of the scaled model under maximum normal conditions as $M_1$; and setting a bending moment at Ai of the scaled model under maximum overload conditions as $M_2$;

3) calculating a first safety factor $K_1$ at Ai of the scaled model under the maximum normal conditions according to $$K_1 = \frac{M_P}{M_1};$$

4) calculating a first overload factor $P_1$ at Ai of the scaled model under the maximum normal conditions according to $$P_1 = \frac{M_P - M_0}{M_1 - M_0};$$

5) calculating a second safety factor $K_2$ at Ai of the scaled model under the maximum overload conditions according to $$K_2 = \frac{M_P}{M_2};$$

6) calculating a second overload factor $P_2$ at Ai of the scaled model under the maximum overload conditions according to $$P_2 = \frac{M_P - M_0}{M_2 - M_0};$$

and 7) acquiring pictures of the scaled model at Ai of the scaled model by an acquisition device and identifying the number of cracks in the pictures; and constructing the cantilever beam when all of the first safety factor, the second safety factor, the first overload factor and the second overload factor are within a preset threshold range and there are no cracks;

wherein the wheeled stand support comprises a first frame and a second frame; the first frame and the second frame each comprise two bases; two ends of each base are respectively provided with a road wheel; and two guides are symmetrically provided on an upper end surface of the base;

a hydraulic cylinder is provided inside each guide; an oil pump is provided at a side of the guide via bolts and is configured to supply power to the hydraulic cylinder; a top end of a piston rod of the hydraulic cylinder is connected to a bottom of a support beam provided inside the guide; a top end of the support beam is fixedly connected to an end of an H-shaped beam; a cross beam is provided at a middle of the H-shaped beam; a triangular bracket is provided on a top of the cross beam; and a support base is welded onto a top of the triangular bracket to support the cantilever beam;

a groove is provided on a bottom of the support base; a plurality of threaded holes are symmetrically provided on both side walls of the groove of the support base; a threaded rod is in threaded connection with each threaded hole; a stopper is welded at an end of the threaded rod; and a rotating handle is welded at the other end of the threaded rod;

a plurality of first bracing frames are symmetrically welded on both sides of the triangular bracket; a plurality of second bracing frames are symmetrically welded on both sides of the triangular bracket; each first bracing frame and each second bracing frame are respectively provided with a first installation groove; a first rotating shaft provided on the first installation groove is rotatably connected to an end of a first connecting rod; a second installation groove is provided in a middle of a side of the first bracing frame and the second bracing frame, respectively; a second rotating shaft is provided at the second installation groove; an end of a first Y-shaped connecting rod is connected to a middle of the second rotating shaft; and a U-shaped end of a second Y-shaped connecting rod is connected to two ends of the second rotating shaft;

the cantilever beam mold comprises two opposite side plates installed in parallel and two opposite end plates installed in parallel; and each end plate is perpendicular to each side plate;

each side plate comprises a middle side plate, two first side plates and two second side plates; the two second side plates are respectively provided on two sides of the middle side plate; and the two first side plates are respectively provided on sides of the two second side plates away from the middle side plate;

a rectangular baffle plate is welded on the middle side plate; and two ends of the rectangular baffle plate are respectively fixed to the two second side plates via bolts;

a third installation groove is provided on each first side plate and each second side plate, respectively; a third rotating shaft is provided at the third installation groove; the other end of the first connecting rod is connected to a middle of the third rotating shaft; and a U-shaped end of the first Y-shaped connecting rod is connected to two ends of the third rotating shaft;

a fourth installation groove is provided under the third installation groove; a fourth rotating shaft is provided at the fourth installation groove; and an end of the second Y-shaped connecting rod is connected to a middle of the fourth rotating shaft;

a rectangular slot is provided on the middle side plate to clamp a pier-top;

a bottom end of the cantilever beam is installed in a pier groove which is provided on the pier-top; a bottom of the pier-top is installed on a top of a bridge pier; a bottom of the bridge pier is installed on an upper end surface of a rectangular bearing platform; four cast-in-place bored piles are provided on a lower end surface of the rectangular bearing platform; and two blocks are symmetrically provided on both sides of an upper end surface of the cantilever beam; and the pier-top and the bridge pier are integrally formed by pouring with C50 concrete; the rectangular bearing platform is formed by pouring with C35 concrete; and the four cast-in-place bored piles are formed by pouring with C30 underwater concrete.

* * * * *